United States Patent [19]

Schmid et al.

[11] Patent Number: 4,775,923

[45] Date of Patent: Oct. 4, 1988

[54] INVERTER FOR CONVERTING A DIRECT VOLTAGE INTO AN ALTERNATING VOLTAGE

[75] Inventors: Jürgen Schmid, Breisach-Niederrimsingen; Rainer Schätzle, Gutach, both of Fed. Rep. of Germany

[73] Assignee: Fraunhofer-Gesellschaft zur Forderung der angewandten Forschung e V., Munich, Fed. Rep. of Germany

[21] Appl. No.: 463,254

[22] Filed: Feb. 2, 1983

[30] Foreign Application Priority Data

Feb. 3, 1982 [DE] Fed. Rep. of Germany ....... 3203478

[51] Int. Cl.$^4$ ............................................. H02M 1/14
[52] U.S. Cl. ......................................... 363/43; 363/98
[58] Field of Search ...................... 363/43, 95, 96, 97, 363/98

[56] References Cited

U.S. PATENT DOCUMENTS 3,579,081  5/1971  Bates ..................................... 363/43

FOREIGN PATENT DOCUMENTS 2015834  9/1979  United Kingdom .

OTHER PUBLICATIONS

*New Type of Transformerless High Efficiency Inverter,* Naaijer,.G. J. Oct. 31, 1980, France, pp. 1068–1072.

*Primary Examiner*—Patrick R. Salce
*Assistant Examiner*—Anita M. Ault
*Attorney, Agent, or Firm*—Sixbey, Friedman, Leedom & Ferguson

[57] ABSTRACT

In an inverter for converting a direct voltage into an alternating voltage, having a number of n circuit units connected in series between two outputs, each circuit unit comprising a series connection, having a direct voltage source and a switch with a switching connection, and a unidirectionally conducting circuit element disposed in parallel with the series connection, the inverter having a control unit which operates the switching connections of the switches to render the switches conductive or non-conductive, in order to minimize the circuitry the voltage values of the direct voltage sources have the values $U = U_O \cdot 2^\nu (\nu = 0, \ldots n-1,\ U_O$ having any desired value), and the control unit is an analog-digital converter (1) having an analog input and digital outputs ($A\nu$), whose analog input receives a reference alternating voltage and from whose digital outputs the $2^\nu$ output is connected to the switch connection ($S\nu$) of the switch of the circuit unit containing the voltage source with the voltage value $U\nu$. Application to mains-connected photovoltaic solar energy installations.

5 Claims, 2 Drawing Sheets

INVERTER FOR CONVERTING A DIRECT VOLTAGE INTO AN ALTERNATING VOLTAGE

BACKGROUND OF THE INVENTION

The invention relates to an inverter for converting a direct voltage into an alternating voltage, having a number of n circuit units connected in series between two outputs, each circuit unit comprising a series connection, having a direct voltage source and a switch with a switching connection, and a unidirectionally conducting circuit element disposed in parallel with the series connection, the inverter having a control unit which operates the switching connections of the switches to render the switches conductive or non-conductive.

Inverters for supplying alternating voltage loads from direct voltage sources are required, for example, in mains-connected photovoltaic installations, in order to convert the direct voltage generated by the solar cells into an alternating voltage of the same frequency and voltage as those of the mains. Similar inverters are also required to ensure the uninterrupted emergency power supply of alternating voltage mains by means of, for example, rechargeable batteries.

It is known to use for this purpose single or multiphase inverters or pulse inverters. As a rule such inverters require choke elements, filter sections and transformers. Such elements are expensive and limit the maximum efficiency and economic utilization of such converters. It is also known that sinusoidal alternating voltage is approximated without choke or filter members or transformers by the serial connection of direct voltage sources of identical voltage at the rhythm of the required sinusoidal output voltage (G. J. Naaijer, New Type of Transformerless High Efficiency Inverter, Third E.C. Photovoltaic Solar Energy Conference, Oct. 1980). However, this type of circuit is economical only for a rough subdivision of the sinusoidal voltage wave shape, since a switch stage is required for each graduation. However, such rough graduations produce a relatively high harmonics content, which cannot be permitted, particularly in mains-connected systems, or even in certain loads.

An inverter of the kind specified is also known (British Laid-open Specification No. 2 015 834). In that known circuit the voltage values of the direct voltage sources are also equal to one another in the individual serially connected circuit units, so that the number of possible voltage stages is equal to the number of circuit units present. If the synthetized alternating voltage is to be very finely staged, a considerable amount of circuitry is required, resulting in an elaborate control unit.

It is also basically known (U.S. Pat. No. 3,579,081) to use voltage sources of different voltage, in a differently constructed inverter, which requires four bidirectional switch elements per circuit unit for the additive and subtractive superposition of the voltages of their direct voltage sources.

SUMMARY OF THE INVENTION

It is an object of the invention to provide an inverter which, using minimum circuitry, is able to synthetize from direct voltages an alternating voltage with very fine staging.

To this end, in an inverter of the kind specified according to the invention the voltage values of the direct voltage sources have the values $U_\nu = U_O \cdot 2^{\nu-1}$ ($\nu = 1, \ldots, n$, $U_O$ having any desired value), and the control unit is an analog digital converter having an analog input and binary digital outputs whose analog input receives a reference alternating voltage and from whose binary digital outputs the $2^\nu - 1$ output is connected to the switching connection of the switch of the circuit unit containing the voltage source with the voltage value $U_\nu$.

Voltage sources with a voltage ratio of $$U_1:U_2:U_3:U_4\ldots;U_n = 1:2:4:8:16:\ldots 2^{n-1}$$

are connected together in the binary mode, the binary output of an analog-digital converter, which samples a reference voltage of the required frequency and waveform in rapid sequence, being used for the binary operation of the corresponding circuit units and switch stages.

The advantages offered by the invention include more particularly the achievement of a high degree of graduation, using only a few switch stages, in the production of sinusoidal alternating voltage. For example, four switch stages enable 16 voltage states to be produced, 5 switch stages giving 32 voltage states (i.e., 15, 31 voltage steps and the zero voltage state, respectively).

A further advantage afforded by the use of the binary outputs of the analog-digital converter for the operation of the switch stages, is the extremely low expenditure of the open and closed control and synchronization of the inverter. This produces the following properties:

(a) Automatically correct and inertia-free adjustable synchronization with the reference voltage, which can be the mains voltage itself in the case of mains-connected systems.

(b) Automatic switching-off of the inverter when the mains are deliberately switched off (e.g., for maintenance purposes). This is an important safety requirement for protecting operators in the case of mains-connected systems.

(c) Automatic switching-off of the inverter in the case of brief interruptions of voltage, e.g., after a lightning strike or during mains short circuiting. In these cases conventional generators deliver heavy short circuit current into the mains, which may endanger both mains components and also the generators themselves, unless they are disconnected by quick-acting monitoring devices.

(d) Automatic readjustment of the mains voltage changes. As a result of the rapidly sampling of the mains voltage in utilizations of composite mains, the inverter output always follows the mains voltage used as a reference. The overvoltage at the inverter required for power delivery therefore maintains its value, even if the mains voltage changes.

(e) Automatic adaptation to altered mains frequencies. As a result of the circuit selected, the inverter output follows all the selected frequencies, so that without any alteration the inverter can operate in association with 50, 60 or 400 Hz mains. Power can also be delivered to direct voltage mains, if the analog-digital converter is connected direct-voltage-fashion to the mains.

(f) If the inverter is operated as an emergency current unit, rechargeable voltage sources can be charged from the mains by suitable measures via the inverter itself. In that case charging is performed via the analog-digital converter and the switch stages at the same rhythm as their discharge in emergency operation. As a result, a uniform full charging state is achieved, even with uneven loading of the indivdual voltage sources. This means that batteries subjected to different loads during the discharge process are charged with a charging current distribution proportional to the discharge current distribution—i.e., a uniform charging state is reached again at the end of the charging operation.

BRIEF DESCRIPTION OF THE DRAWINGS

An embodiment of the invention will now be described with reference to the accompanying drawings, wherein.

DESCRIPTION OF THE PREFERRED

Figure 1:
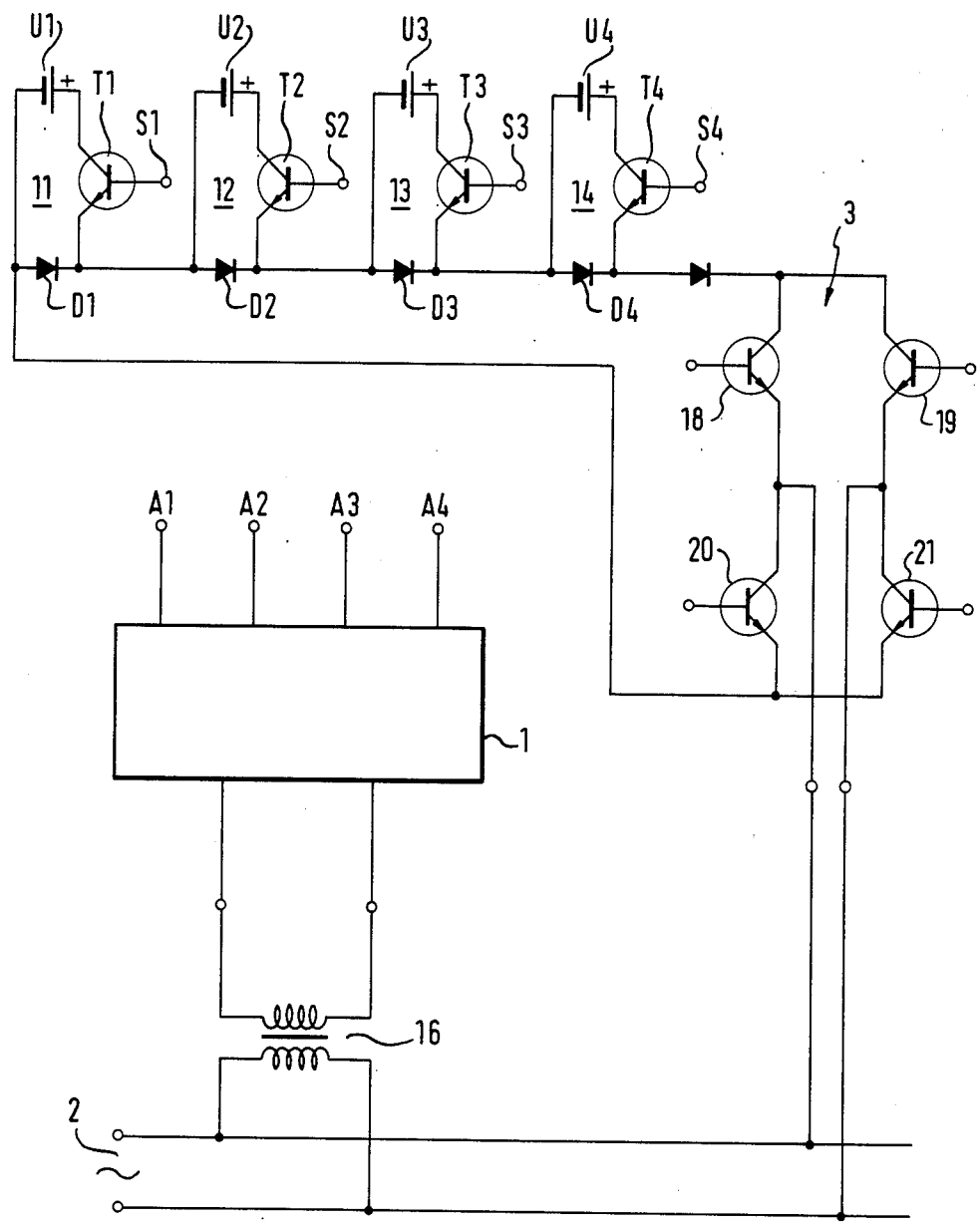
FIG. 1 is a circuit diagram of the inverter according to the invention for connection to the mains.

EMBODIMENT The inverter shown in FIG. 1 comprises four serially connected switch stages 11,12,13,14, each of which comprises a series connection of a direct voltage source U$\nu$ and a transistor T$\nu$ connected via the collector-emitter path and a diode D$\nu$ ($\nu$=1,2,3,4) disposed in parallel with such series connection. The diodes D$\nu$ are all poled in the same direction and such that when the transistor T$\nu$ is in the conductive state, they prevent any short circuiting of the voltage source U$\nu$. When the transistor T$\nu$ is blocked, they bridge the series connection formed by the voltage source and transistor. The voltage values of the direct voltage sources U1, U2, U3 and U4 stand in the ratio of 1:2:4:8.

An analog-digital converter 1 is also provided which is connected by its analog input via an isolating transformer 16 to alternating voltage mains 2. When a mains voltage appears in the mains 2, a binary signal proportional to the instantaneous mains voltage occurs at the binary digital outputs A1 to A4 of the analog-digital inverter. The binary signal is supplied via a potential-free coupling to the switching connections of the switches of the switch stages—i.e., in the present case to the base connections S1 to S4 of the transistors T1 to T4—, in such a way that the output A1 is connected to S1, the output A2 being connected to S2 etc. Ao long as there is not voltage at the input of the analog-digital converter 1, its outputs A1 to A4 are free from signals, and the transistors T1 to T4 are in the non-conductive state. In dependence on its configuration, the binary signal occurring at the outputs of the analog-digital converter when an alternating voltage appears at its input makes conductive all the transistors T1 to T4, or certain of them. To be precise, those transistors are made conductive whose bases are connected to an H-type output of the analog-digital converter. Those transistors whose bases are connected to a L-type output of the analog-digital converter remain non-conductive. If, for example, binary outputs A1 and A3 of the analog-digital converter are H and the two other outputs A2 and A4 are L (binary representation of the numeral 5), the transistor T1 and the transistor T3 are made conductive, and a voltage U=U1+U3=5 U1 is produced at the output of the series connection of the switch stages. An analog-voltage proportional to the binary signal at the output of the analog-digital converter 1 therefore occurs between the outputs of the series connection of the switch stages 11 to 14.

The outputs of the series connection of the switch stages 11 to 14 are connected to the inputs of a controlled full wave bridge circuit 3. The full wave bridge circuit is built up from four transistors 18,19, 20,21 which are in series in pairs (18,20; 19,21) via their collector-emitter paths, the two transistor serial connections thus formed lying in parallel. The outputs of the full wave bridge circuit are the junctions of the two transistors of each pair of transistors connected in series. The bases of the four transistors 18 to 21 are (in a manner not shown) so operated by the polarity of the alternating voltage at the input of the analog-digital converter 1, that the transistors 18 and 21 associated with different serial pairs and lying diagonally in the circuit are made conductive for the positive half-wave, the two other transistors 19 and 20 being made conductive for the negative half-wave. As a result, the sinusoidal half-wave sequence produced at the outputs of the series connection in this embodiment is converted into a genuine sinusoidal alternating voltage.

Figure 2:
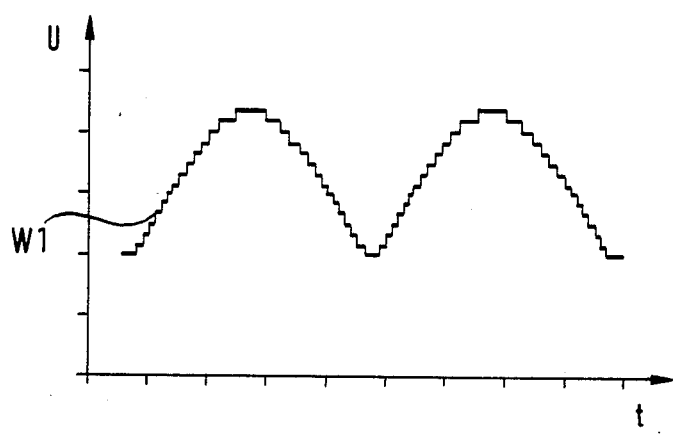
FIG. 2 shows the measured sinusoidal half-wave sequence (1) at the output of the circuit units forming the switch stages, and the fully produced sinewave (2) at ohmic load and at the output of the controlled full bridge circuit respectively, in the case of an inverter operated with four voltage sources.
Figure 2:
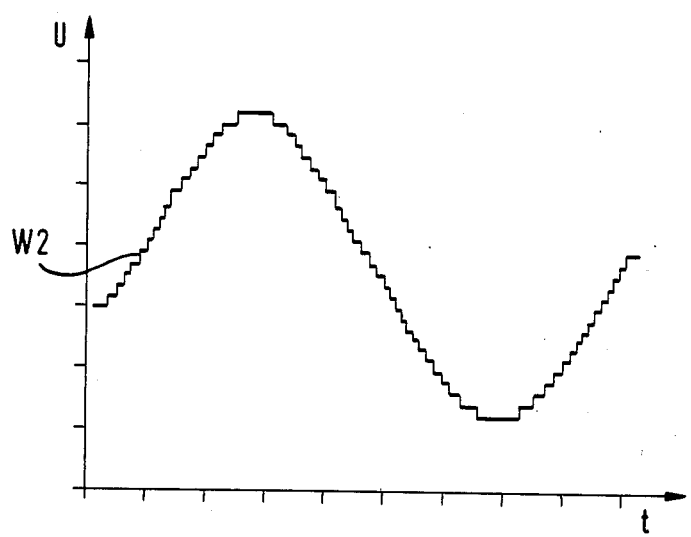

FIG. 2 shows the measured sinusoidal half-wave sequence (W1) at the output of the switch stages and the fully produced sine wave (W2) at ohmic load and at the output of the controlled full wave bridge in the case, illustrated in FIG. 1, of an inverter operated with four voltage sources.

We claim:

1. An inverter for converting a direct voltage into an alternating voltage, having a number of n circuit units connected in series between two outputs, each circuit unit comprising a series connection, having a direct voltage source and a switch with a switching connection, and a unidirectionally conducting circuit element disposed in parallel with the series connection, the inverter having a control unit which operates the switching connections of the switches to render the switches conductive or non-conductive, wherein the voltage values of the direct voltage sources are different from each other having a respective value in accordance with the relationship $U\nu = U_O \cdot 2^{\nu-1}$ ($\nu=1,\ldots,$ n, $U_O$ having any desired value), and wherein the control unit is an analog-digital convertor having an analog input and binary digital outputs, said binary digital outputs being proportional to a reference alternating voltage received by the analog input and each binary digital output being connected to the switching connection of a respective one of the n circuit units in a selectively actuatable manner operable for producing a voltage wave having an amplitude formed of $2^n - 1$ steps from the n direct voltage sources of the n circuit units.

2. An inverter according to claim 1 wherein a full wave bridge circuit is provided which has two inputs and two outputs, the two outputs of the circuit units connected in series being connected to the inputs of the full wave bridge circuit, and the full wave bridge circuit is so controlled, in dependence on the reference alternating voltage, that the polarity of the alternating voltage at the outputs of the full wave bridge circuit is a function of the polarity of the reference alternating voltage.

3. An inverter according to claim 2, wherein the alternating voltage at the ouputs of the full wave bridge circuit is connected to the mains, and the sample voltage is the mains voltage itself.

4. An inverter according to claim 2, wherein the voltage sources provided are rechargeable batteries, and the charging is performed via the inverter itself by backward-leading switch stages which are operated by the analog-digital converter during the charging at the same rhythm as during the discharge process.

5. An inverter according to claim 1, wherein the voltage sources provided are rechargable batteries, and the charging is performed via the inverter itself by backward-leading switch stages which are operated by the analog-digital converter during the charging at the same rhythm as during the discharge process

* * * * *